United States Patent
Ito et al.

(10) Patent No.: US 8,470,902 B2
(45) Date of Patent: Jun. 25, 2013

(54) CONTINUOUS PORE ELASTOMER AND PROCESS FOR PRODUCING THE SAME, AND WATER-ABSORBING ROLLER AND SWAB

(75) Inventors: Yoshiaki Ito, Marugame (JP); Katsuyoshi Watanabe, Osaka (JP)

(73) Assignee: Fushimi Pharmaceutical Company, Limited, Kagawa (JP)

( * ) Notice: Subject to any disclaimer, the term of this patent is extended or adjusted under 35 U.S.C. 154(b) by 1132 days.

(21) Appl. No.: 11/791,995

(22) PCT Filed: Nov. 22, 2005

(86) PCT No.: PCT/JP2005/021412
§ 371 (c)(1),
(2), (4) Date: May 31, 2007

(87) PCT Pub. No.: WO2006/059508
PCT Pub. Date: Jun. 8, 2006

(65) Prior Publication Data
US 2008/0119579 A1    May 22, 2008

(30) Foreign Application Priority Data
Dec. 1, 2004   (JP) .................. 2004-348452

(51) Int. Cl.
*C08G 18/06*    (2006.01)
(52) U.S. Cl.
USPC ........... 521/170; 521/114; 521/130; 521/172; 521/174
(58) Field of Classification Search
USPC ............... 521/170, 114, 130, 172, 174
See application file for complete search history.

(56) References Cited

U.S. PATENT DOCUMENTS

| | | | | |
|---|---|---|---|---|
| 3,787,543 A * | 1/1974 | Parrish | ............ | 264/53 |
| 3,793,413 A * | 2/1974 | Hayes, Jr. | ............ | 264/41 |
| 4,647,596 A * | 3/1987 | Ishii et al. | ............ | 521/159 |
| 5,328,935 A * | 7/1994 | Van Phan et al. | ............ | 521/64 |
| 5,852,063 A * | 12/1998 | Meinhardt | ............ | 521/83 |
| 2004/0229966 A1* | 11/2004 | Dontula et al. | ............ | 521/50 |

FOREIGN PATENT DOCUMENTS

| | | |
|---|---|---|
| JP | 3-174457 A | 7/1991 |
| JP | 2001-81227 A | 3/2001 |
| JP | 2005-312798 A | 11/2005 |
| JP | 2005-330474 A | 12/2005 |

OTHER PUBLICATIONS

"Microcellular Polyurethane as Steering Coupling Element"; BASF catalog for CELLASTO; May 28, 2009.
Briscall et al.; "Cellular structure and physcial properties of plastics:" British Plastics; Jul. 1968; p. 80.
Microcellular Plastics Lab—University of Washington, http://faculty.washington.edu/vkumar/microcel/intro.html (Mar. 8, 2011).
Plastic Foam Handbook; published Feb. 28, 1973; p. 208.

\* cited by examiner

*Primary Examiner* — John Cooney
(74) *Attorney, Agent, or Firm* — Birch, Stewart, Kolasch & Birch, LLP

(57) ABSTRACT

A continuous pore elastomer featured by being made of a polyurethane, having a three dimensional network pore structure of which skeletons have an average thickness of 20 µm or less and 80% or more of the skeletons have a thickness within the range of 2 to 20 µm, having an apparent density of 0.2 to 0.4 g/cm$^3$, containing a surfactant with a HLB value of 8 or more, and being capable of absorbing water instantly;
a process for producing the continuous pore elastomer, comprising a step of extracting out the pore generation agent from the molding with water; and
a water-absorbing roller and a swab obtained by using the continuous pore elastomer.

7 Claims, 2 Drawing Sheets

CONTINUOUS PORE ELASTOMER AND PROCESS FOR PRODUCING THE SAME, AND WATER-ABSORBING ROLLER AND SWAB

FIELD OF THE INVENTION

The present invention relates to a continuous pore elastomer made of polyurethane and a process for producing the same. The present invention further relates to a water-absorbing roller and swab using the continuous pore elastomer.

BACKGROUND ARTS

Since continuously porous foams made of polyurethane are light and have functions of absorbing liquids, storing liquids, permeating liquids and gases, absorbing sounds, selectively removing solids, absorbing shocks and the like, they are applied to ink rollers, self-inking rubber stamps, writing-brush pens, filters, sponges for cosmetics and the like.

Foams made of polyurethane have been mainly produced by chemical foaming methods and the like. However, since, in the chemical foaming methods, pores are formed with a gas generated in chemical reaction, it has been impossible to make the so-called cell-diameters 200 μm or less on average and the resultant foams have been unable to effectively absorb fine water droplets. Therefore, continuously porous foams produced by extraction methods using a pore generation agent are proposed.

For example, JP52-32971A (Patent Literature 1) discloses a porous molding produced by kneading a composition consisting of a thermoplastic polyurethane, calcium carbonate in a form of powder soluble to an acid, a surfactant or polyhydric alcohol, dimethylformamide and acetone, thermally molding the kneaded composition at 130° C., and immersing the resultant molding in an aqueous hydrochloric acid solution and then washing and drying.

In this process, the calcium carbonate is added as a pore generation agent, and pores are formed by extracting the calcium carbonate dispersed in the molding with acid and water followed by washing. In addition, the surfactant is added to facilitate extraction of the calcium carbonate with water.

As an alternative, JP58-189242A (Patent Literature 2) discloses a porous polymer foam produced by a process of dissolving a polyurethane in a solvent such as dimethylformamide, mixing the resultant solution with a composition compounded with a pore generation agent such as polyvinyl alcohol, filling in a predetermined mold to coagulate the polyurethane in an non-solvent for the polyurethane, followed by extracting out the pore generation agent with a large quantity of water.

Currently, in manufacturing precise products such as printed circuit boards and lead frames, continuous pore elastomers made of polyurethane are increasingly demanded in applications to water-absorbing rollers for cleanly and uniformly draining off water droplets adhered on the surfaces of water-washed product and to swabs for absorbing water adhered on the precise products. The continuous pore elastomers used for such applications are required to have a property of instantly absorbing water. Furthermore, for the application to water-absorbing rollers, also required is a property effectively spitting out water in compressing the rollers with an external force. However, it has been difficult for the above-mentioned continuous pore elastomers to provide such properties and they have not suited to the applications such as water-absorbing rollers and swabs. Accordingly, the development of continuous pore elastomers having excellent properties such as instantly absorbing water has been desired.

In addition, since such continuous pore elastomers have become widely used for applications of daily life and industries, the development of methods for producing the continuous pore elastomers massively, inexpensively and stably is desired. The above-mentioned production process described in Patent Literature 1, however, requires a heating at a high temperature in a step of producing kneaded composition, resulting in production cost increase and causing ingredient degradations. Furthermore, use of an organic solvent with low-boiling point causes a possibility of taking fire at a high temperature. Moreover, use of the aqueous hydrochloric acid solution requires neutralizing a liquid wasted after the use, also causing a cost increase.

On the other hand, the process of Patent Literature 2 requires about 1 week until the coagulation completes, for example, when the molding has a thickness of 20 mm, and also needs a mold for molding fabricated with an expensive porous material in its production. Particularly, for mass production, a great number of such molds are required, resulting in increase of the production cost. Therefore, the development of a process for producing a continuous pore elastomer, which is free from the problems of the conventional techniques, is desired.

Patent Literature 1: JP52-32971A
Patent Literature 2: JP58-189242A

DISCLOSURE OF THE INVENTION

Problems to be Solved by the Invention

The present invention has been achieved under the consideration of the above background and intends to provide a continuous pore elastomer which is made of polyurethane and can instantly absorb water adhered on precise products and the like, and a water-absorbing roller and swab obtained by using the continuous pore elastomer. The present invention further intends to provide a process for producing a continuous pore elastomer, which can produce a continuous pore elastomer having a property of instantly absorbing water or a continuous pore elastomer enabling the property, without heating a starting material, without using a powerful medicine such as acids or alkalis, and without using a mold for molding, in the production process.

Means for Solving the Problems

The inventors, after conducting extensive studies, have found that a continuous pore elastomer having a three dimensional network pore structure of which skeletons are thin and uniform, having an apparent density within a predetermined range and containing a surfactant with high HLB value can instantly absorb adhered water.

The inventors further have found that
a process consisting of kneading a polyurethane with a pore generation agent soluble to water and capable of forming a molecular compound with a solvent, molding, and coagulating, followed by extracting the pore generation agent from the molding with water
can produce a continuous pore elastomer enabling a property of instantly absorbing water,
without heating a starting material, without using a powerful medicine such as acids or alkalis, and without using a mold for molding. Thus the present invention has been completed.

The invention firstly provides
a continuous pore elastomer featured by
being made of a polyurethane, having a three dimensional network pore structure of which skeletons have an average thickness of 20 μm or less and 80% or more of the skeletons have a thickness within the range of 2 to 20 μm, having an apparent density of 0.2 to 0.4 g/cm³ and containing a surfactant with a HLB value of 8 or more (Claim 1).

The three dimensional network pore structure is a structure shown in FIG. 1 and defined as the structure wherein the network linking in three dimensional directions is composed of the skeletons of polyurethane, pores formed between the skeletons are continuous each other and no membrane plugging the network can be observed. The continuous pore elastomer of the invention is featured by that the skeletons thereof have an average thickness of 20 μm or less.

The continuous pore elastomer of the invention is further featured by that the skeletons composing the network structure have substantially uniform thicknesses. Specifically, 80% or more of skeletons have a thickness within the range of 2 to 20 μm. Preferably, 80% or more of skeletons have a thickness within the range of 6 to 15 μm. Thus substantially uniform skeleton thickness enhances a property of effectively spitting out water when the continuous pore elastomer having absorbed water is compressed with an external force, and makes it possible to be suitably applied for water-absorbing rollers.

The continuous pore elastomer of the invention is further featured by having an apparent density of 0.2 to 0.4 g/cm³. Herein, the apparent density means a value measured according to the method described in JIS K 7222. The continuous pore elastomer of the invention is featured by containing a surfactant with a HLB value of 8 or more, wherein the HLB value is a known index representing balance of hydrophilicity and hydrophobicity of a surfactant and a method of determining the value thereof is described in KAGAKU JITEN (Chemical dictionary) edited by Michinori OKI et al published by TOKYO KAGAKU DOZIN, Co. Ltd. page 178. In case of the surfactant being fatty acid ester, for example, the value is calculated with the following equation:

$$HLB = 20 \cdot (1 - SV/NV)$$

wherein SV is the saponification value of the ester and NV is the neutralization value of the fatty acid.

The continuous pore elastomer of the invention exhibits an excellent effect of instantly absorbing water into the continuous pore elastomer. Specifically, it makes a residual water quantity 1 g/1000 cm² or less, the quantity being determined by the measuring method described in Examples mentioned hereinafter. If the HLB value of the surfactant is smaller than 8, it is difficult to achieve this effect.

The HLB value of the surfactant is preferably 19 or less. Claim 2 corresponds to this preferred embodiment. When the HLB value is more than 19, the surfactant is extracted with water in the processes of coagulating and washing with water in producing the continuous pore elastomer. This decreases the quantity of surfactant left in the continuous pore elastomer and may make the ability of absorbing water insufficient.

A content of the surfactant is preferably in the range of from 0.5 to 40 parts based on 100 parts by weight of solvent-borne polyurethane having the nonvolatile content of 30% by weight. When being less than 0.5 parts by weight, the property instantly adsorbing water into the continuous pore elastomer becomes insufficient; while, when being more than 40 parts by weight, the surfactant may migrate away from the continuous pore elastomer and also reduce a mechanical strength of the continuous pore elastomer.

Examples of the surfactants include partial fatty acid esters of polyhydric alcohols such as sorbitan fatty acid esters, beef tallow glycerideethoxylates and polyglycerin fatty acid esters; ethylene oxide addition products of fatty alcohols such as polyethyleneglycol laurylethers and polyethyleneglycol stearylethers; ethylene oxide addition products of fatty acids such as polyoxyalkyleneether tallowates, polyoxyethyleneglycol oleates, polyethyleneglycol monostearates; ethylene oxide addition products of fat amide or fatty acid amide; ethylene oxide addition products of alkyl phenols such as nonylphenolethoxylate and octylphenolethoxylate; ethylene oxide addition products of alkylnaphthols; and ethylene oxide addition products of partial fatty acid esters of polyhydric alcohols.

The invention further provides a process for producing a continuous pore elastomer, comprising;

a step of kneading a composition containing, as major ingredients, a polyurethane, a solvent and a pore generation agent soluble to water and capable of forming a molecular compound with the solvent, a step of deaerating and molding the composition, a step of coagulating the molding obtained and a step of extracting out the pore generation agent from the coagulated molding with water, followed by drying (Claim 3). Thus the production process can provide a continuous pore elastomer made of a polyurethane, having a three dimensional network pore structure of which skeletons have an average thickness of 20 μm or less, and having an apparent density of 0.2 to 0.4 g/cm³.

The inventors have found that kneading a composition containing, as major ingredients, a polyurethane, a solvent and a pore generation agent soluble to water and capable of forming a molecular compound with the solvent produces the kneaded composition which has plasticity and shape-retaining ability like clays and is suitable for molding. This is a unique phenomenon never found in kneading another pore generation agent with a polyurethane.

Herein, the terms of "molecular compound" means a compound formed by direct bonding of 2 or more kinds of stable molecules in a certain ratio and characterized by that the constituent molecules thereof are loosely bonding each other, do not change their original structures and properties so much and readily dissociate to the respective original states. The pore generation agent used in the production process of the invention forms the molecular compound by addition of a solvent molecule.

When the pore generation agent capable of forming a molecular compound is added and dissolved under stirring the solvent, until a certain criterion of addition, the mixture stays a solution state, but after exceeding the criterion, the state of the mixture suddenly changes to an almost solid state. This solid state resultant is re-dissolved by contacting with water and the like. It is understood that compatible dissolution of a polymer material with the state of such pore generation agent, present in a solvent and loosely bonding with the solvent, allows the development of a specifically characteristic clay-like plasticity and shape-retaining ability.

The plasticity is important to mold the composition kneaded by extrusion or the like into a desired shape. In addition, the coagulation step after the molding step requires a long time, for example, a composition having the thickness of 10 mm requires 12 to 18 hours until completing its coagulation in water at 25° C. Accordingly, for maintaining a desired shape without using a mold for molding until the composition completes its coagulation, the property to maintain the desired shape after being molded, i.e. favorable shape-retaining ability after being shaped are important.

Furthermore, the use of the kneaded composition having clay-like plasticity and shape-retaining ability allows to obtain a molding of which skeletons are thin and uniform and spread in a three dimensional network, easily. Then, extracting the pore generation agent from the molding with water readily gives a continuous pore elastomer having an apparent density of 0.2 to 0.4 g/cm$^3$.

Examples of the pore generation agent providing a clay-like plasticity and shape-retaining ability to a kneaded composition include fine particles of inorganic salts such as calcium chloride and magnesium chloride. Calcium chloride is particularly preferable because of readily forming a molecular compound and providing the above-mentioned effects greatly. Besides, calcium chloride is advantageous in terms of its inexpensiveness and easy availability. Claim 4 corresponds to this preferable embodiment.

The pore generation agent is added preferably in a quantity of 20 to 100 parts by weight based on 100 parts by weight of a solvent-borne polyurethane having the nonvolatile content of 30% by weight. When the quantity of addition is less than 20 parts by weight, the plasticity and shape-retaining ability of the kneaded composition become insufficient and may be difficult to obtain a desired shape in molding; while, when being more than 100 parts by weight, the composition become a nearly solid state in kneading and may cause difficulty in molding.

In addition, the quantity of addition allows regulating the apparent density of the continuous pore elastomer to be obtained finally and the average thickness of the skeletons structuring the network of the three dimensional network pores That is, when a quantity of addition is small, the apparent density and skeletons' average thickness increase; while, when a quantity of addition is large, this results in the reverse effects.

The continuous pore elastomer obtained by the above-mentioned production process of the invention, i.e. the continuous pore elastomer having the three dimensional network pore structure of which skeletons have an average thickness of 20 μm or less and having an apparent density of 0.2 to 0.4 g/cm$^3$, contains a surfactant having a HLB value of 8 or more. This realizes the above-mentioned continuous pore elastomer of the invention and allows exhibiting an excellent effect of instantly absorbing water into the continuous pore elastomer. That is, a quantity of residual water determined by a method of measuring residual water quantity described in the Example mentioned hereinafter is allowed to be 1 g/1000 cm$^2$ or less.

An example of the method for making the continuous pore elastomer with a surfactant having a HLB value of 8 or more is a process of adding a surfactant having a HLB value of 8 or more to a composition comprising, as major ingredients, a polyurethane, a solvent and a pore generation agent, followed by the steps in the process according to Claim 3 or 4. Claim 5 is a process for producing a continuous pore elastomer corresponding to this embodiment.

Another example of the method for making the continuous pore elastomer with a surfactant having a HLB value of 8 or more is a process of, after the step of extracting a pore generation agent with water, or after the step of further drying, in the process according to Claim 3 or 4 mentioned above, adding a surfactant having a HLB value of 8 or more to the molded article obtained. Claim 6 is a process for producing a continuous pore elastomer corresponding to this embodiment, and is a process for producing a continuous pore elastomer according to Claim 3 or 4, being featured by further having a step of adding a surfactant having a HLB value of 8 or more to the molded article, after the step of extracting the pore generation agent from the coagulated molding with water or after the drying. Examples of the method for adding the surfactant include a method of impregnating the molded article obtained with a liquid containing the surfactant by immersing therein and drying, and the like.

After kneading the composition containing a polyurethane, a solvent, a pore generation agent and the like, the kneaded composition is deaerated and molded. The purpose of the deaeration is to remove babbles contained in the composition.

After molding, the molding is taken out to be coagulated. Examples of the method of coagulation include wet processes in which the molding is immersed in a liquid to remove a solvent and coagulated, the liquid being a non-solvent for polyurethane such as water and compatibly soluble with a solvent for a polyurethane. Among wet processes, preferable is a water coagulation process in which the molding is immersed in water to remove the solvent and coagulated, because this process allows a favorable shape-retaining ability, readily shifting to a water-extraction step of a post step and providing a uniform sponge structure. Claim 7 corresponds to this preferred embodiment.

The continuous pore elastomer of the invention has a feature of instantly absorbing water, thus it is suitably used for water-absorbing rollers and swabs which require such property. Claim 8 provides a water-absorbing roller using the above-mentioned continuous pore elastomer of the invention, and Claim 9 is a swab using the above-mentioned continuous pore elastomer of the invention.

The water-absorbing roller of the invention may be formed by molding the continuous pore elastomer of the invention in a cylindrical shape and mounting a shaft in the central hole thereof. In this case, the shaft and continuous pore elastomer may be adhered each other with an adhesive. Thereafter, a grinding processing is usually subjected to enhance a surface smoothness and circularity of the roller.

Since this water-absorbing roller has a property of instantly absorbing water, it is suitably used for applications of cleanly and uniformly draining off water droplets adhered on the water-washed surfaces of the products in manufacturing precise products. A roller applying the continuous pore elastomer wherein the HLB vale of a surfactant is 19 or less is particularly preferable, because its property of effectively spitting out water with an external force is excellent.

The feature of instantly absorbing water provided by the continuous pore elastomer of the invention is also useful for swabs which are used for wiping narrow spaces such as narrow specific places, corners and ditches in manufacturing electronics devices, optical devices and the like. In addition to cotton swabs applying cotton for the wiping elements thereof, many kinds and types of swabs, which apply, for the wiping elements thereof, knitted clothes of polyester, dry-foaming polyurethane sponges, clothes woven with ultramicro filament of 0.5 deniers or less and the like, are known. However, any of them do not have a feature to quickly absorb water.

In manufacturing electronics devices, optical devices and the like, required is the wiping ability to leave the un-wiped little. In order to completely wipe out stains to be wiped or stains which are diluted with water being co-used for wiping, the stains must be quickly absorbed into a wiping element before being spread out by the wiping element during wiping. Since the continuous pore elastomer of the invention can quickly absorb the stains, it can be suitably used for the wiping element of swabs.

The swab of the invention using the continuous pore elastomer of the invention can be produced by molding the above-mentioned continuous pore elastomer with a size and shape fit to the wiping element and with a hole, and putting an end of a rod made of polypropylene and the like into the hole.
Effects of the Invention The continuous pore elastomer of the invention exhibits an excellent effect of instantly absorbing water into the continuous pore elastomer. Specifically, it makes the measured quantity of residual water described in the Examples mentioned hereinafter 1 g/1000 cm² or less. Therefore, it is suitably used for water-absorbing rollers and swabs which require a property of instantly absorbing water.

According to the process for producing a continuous pore elastomer of the invention, a continuous pore elastomer made of a polyurethane, having a three dimensional network pore structure of which skeletons have an average thickness of 20 μm or less and 80% or more of the skeletons have a thickness within the range of 2 to 20 μm, having an apparent density of 0.2 to 0.4 g/cm³ and having a desired shape, can be produced without heating at a high temperature during its production process, without using chemicals such as acids or alkalis and without preparing a mold for molding using a expensive porous material. By containing a surfactant having a HLB value of 8 or more in the continuous pore elastomer thus obtained, a continuous pore elastomer of the invention having the above-mentioned excellent features can be provided.

The water-absorbing roller and swab of the invention which are provided by applying the continuous pore elastomer of the invention can instantly absorb water and be suitably used for various applications requiring absorbing property, such as applications of cleanly and uniformly draining off water droplets adhered on the surfaces of water-washed products in processes manufacturing precise products, and applications for wiping in manufacturing electronics devices, optical devices and the like.

BEST MODE FOR CARRYING OUT THE INVENTION

Figure 1:
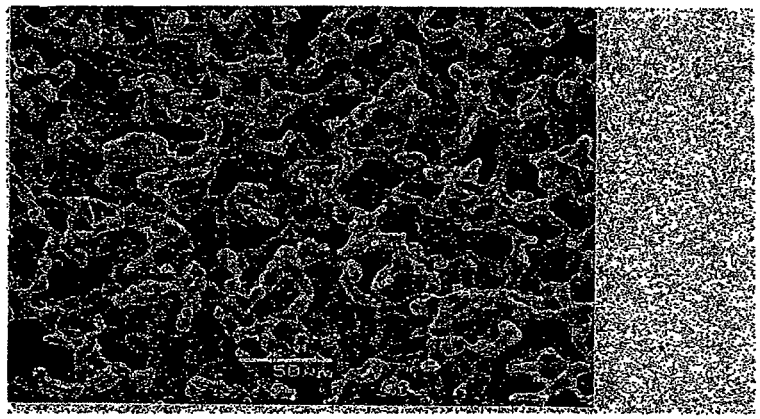
[FIG. 1] A scanning electron microscope photo of the three-dimensional-network continuously porous foam obtained in Example 1.

Specific modes to carry out the invention, particularly preferred examples of the modes will be explained as follows.

The polyurethane used in the invention is obtained by reacting a polyol constituent consisting of a high molecular weight polyol and a chain extender, and a polyisocyanate compound.

The high molecular weight polyol includes polyether polyols such as polypropylene glycols, polytetramethyleneglycols and polymer polyols; adipate polyols; polyester polyols such as polycaprolactone polyols; polycarbonate polyols, polyolefin polyols and the like, and a preferable molecular weight thereof is 500 to 10000.

The chain extender includes ethylene glycol, 1,4-butanediol, 1,6-hexanediol, 1,5-pentanediol, 3-methyl-1,5-pentanediol, 1,3-propanediol and the like.

The polyisocyanate compound includes aromatic isocyanates such as methylenediphenyl diisocyanate, tolylene diisocyanate, xylylene diisocyanate, naphtylene-1,5-diisocyanate and tetramethylenexylylene diisocyanate; alicyclic isocyanates such as isophorone diisocyanate and dicyclohexylmethane diisocyanate; and aliphatic isocyanates such as hexamethylene diisocyanate, dimer acid diisocyanate, and norbornene diisocyanate.

The solvent used in the production process of the invention usually includes organic solvents such as dimethylformamide, dimethylsulfoxide, dioxane, tetrahydrofuran, methylpyrrolidone and N-methylpyrrolidone, and a mixture thereof. Among these, preferable is dimethylformamide in consideration of ability of being readily extracted out with water in the post step, and smell of solvent and its flammability in a working environment.

The composition in the process of the invention containing a polyurethane, solvent and pore generation agent, and optionally containing a surfactant depending on requirements, may further contain a colorant, antioxidant, antifungal agent, antibacteria agent, surfactant, material exhibiting various lubricant functions, flame retarder and functional materials such as conductive materials, e.g. carbon black.

The fine particles of inorganic salts such as calcium chloride and magnesium chloride, which are used as the pore generation agent, include anhydrous matters and matters containing crystalline water as commercially available, while the anhydrous matters are preferable to stabilize the composition. Furthermore, fine particles of the inorganic salt can more shorten a time required for kneading as the particle diameters thereof are smaller, preferably being 200 μm or less.

For kneading the composition, kneaders, Auger kneaders, Banbury mixer and mono- or bi-axial screw extruders are used. During kneading, a heat is generated when constituents of the composition uniformly mix and form a molecular compound. Therefore, the kneading vessel is required to be cooled with water or the like.

The specific method of deaerating the kneaded composition includes a depressurized deaeration using a vent-type extruder. For the specific method of molding, preferable is a method of shaping into a desired shape by connecting a nozzle to the above-mentioned extruder.

Thus extruded composition is a clay-like plastic matter of which specific gravity is preferably of 1 to 2. In this case, an aqueous solution is prepared which has a specific gravity adjusted equal to or smaller (within 0.5) than that of the extruded composition by using a water soluble inorganic salt. A water vessel containing this aqueous solution is installed at the outlet of the nozzle for introducing the extruded composition therein to obtain the molding.

Thereafter, the coagulation is carried out by a method of removing a solvent with a liquid being a non-solvent for polyurethane and compatibly soluble with the solvent for polyurethane, for example, water in the above-mentioned water vessel, or the like.

After the coagulation, the pore generation agent contained in the molding is removed by a water extraction. The water extraction is specifically carried out such that the coagulated article is put in a general washing machine or the like and washed with water at 20 to 80° C. for 15 to 90 minutes while changing the water several times. Consequently, the pore generation agent can be almost completely removed.

After the water extraction, the molded article is dried at 110° C. or lower. Specifically, box-type dryers or tumblertype dryers are used for the drying. Thus, the continuous pore elastomer of the invention is obtained.

EXAMPLES

Next, the invention will be explained more specifically based on Examples, but the scope of the invention is not limited thereto.

Firstly, methods for evaluating the continuous pore elastomers obtained in each Example and Comparative Example are illustrated as follows.

Evaluation Methods

[Apparent Density]: Measured according to JIS K 7222.

[Tensile Strength and Elongation]:

Measured according to JIS K 6400-5.

[Water Absorbency Test]:

According to JIS L 1907 (according to the dropping method and Byreck method, a time at measuring a height of absorbed water was set at the passing of 60 seconds.)

[Extrudability (Plasticity) and Shape-Retainability of Kneaded Composition]

A kneaded composition was extruded out from a vent-type extruder having a screw with 40 Φ diameter which is connected with a tube-nozzle with 46 mm outer diameter and 20 mm inner diameter at a temperature range of 40 to 50° C. A direction of extrusion was set downward, and the composition extruded out from the nozzle was introduced directly into an aqueous solution of calcium chloride or magnesium chloride having a specific gravity of 1.1 to 1.2, followed by cutting in a length of 50 cm. A temperature of the aqueous solution was set at 20 to 25° C., and a distance between the nozzle end and aqueous solution surface was set at 10 cm. The extrudability was evaluated by checking by eye whether the shape of the composition extruded out from the nozzle retained the predetermined shape proportional to the outer diameter of the nozzle or was distorted due to drooping. The one not causing the drooping was evaluated as good.

Figure 4:
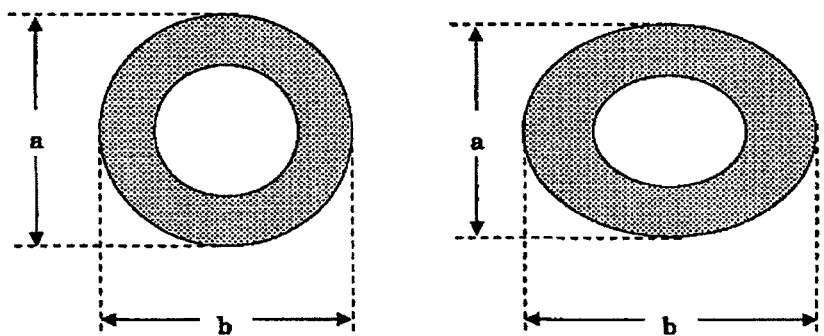
[FIG. 4] A schematic view showing "a"s and "b"s of cross sections of a tube of the continuous pore elastomer and a tube in evaluating shape-retaining ability.

The above-mentioned extruded composition was left as it is for 12 hours, and finished its coagulation, then taken out, followed by being washed and dried. Thus produced tube of the continuous pore elastomer was cut by a cutter in a direction vertical to the extrusion direction at about central part thereof. FIG. 4 shows a schematic view of a cross section of the tube after being cut, and a minimum diameter a and maximum diameter b thereof. The minimum diameter a and maximum diameter b of the cross section were measured with a slide gauge to determine a value of b/a as an index of the shape-retainability.

[Pore State of Continuous Pore Elastomer and Average Thickness of Skeletons]

An appearance of the above-mentioned cross section after being cut was observed by eye and by scanning electron microscope to evaluate the pore state. Furthermore, among the skeletons of the three dimensional network pore structure found in the scanning electron microscope photo, ten parts stretched like a rod were selected to measure thicknesses thereof and the average of the measured values was defined as an average thickness of the skeletons of the three dimensional network.

[Quantity of Residual Water]

A roller was operated under the measurement conditions described below to continuously pass Al plates (aluminium plates) at a rate of 50000 plates/hour between rollers. When one hour elapsed after starting the operation, 100 to 130 plates were picked out from the plates just after passing through, and weights of water left on the Al plate surfaces were measured with a precision balance. Since the water weight measured depends on the number of Al plates picked out, the weight was normalized in terms of the Al plate surface area of 1000 cm$^2$ to determine a quantity of the residual water in the unit of g/1000 cm$^2$.

The residual water quantity and a feeling touched with a finger correlate as follows:

0.80 g/1000 cm$^2$ or more: exactly wetted;
0.20 g/1000 cm$^2$: slightly wetted; and
0.10 g/1000 cm$^2$ or less: no sense of wetting.

Measurement Conditions

Roller Dimensions: Into an center hole of a tube shaped continuous pore elastomer with an outer diameter of 42 mm and inner diameter of 19 mm, a shaft with an outer diameter of 22 mm put with a two-sided adhesive tape was pressed, and then the tube shaped continuous pore elastomer was ground to make the outer diameter thereof Φ440 mm and cut in a length of 200 mm.

Arrangement of Rollers: Two sets each of upper rollers and lower rollers (The total number of rollers is 4.)

Distance between Upper and Lower Axes: 35 mm.
Distance between Front and Rear Axes: 45 mm.
Tested Substrate: Al Plate Φ24.9 mm×1.2 mm thick.
Quantity of Water Adhered on surface of water absorption substrate before Passing through Rollers: 22 g/1000 cm$^2$.
Water Temperature: 20±2° C.
Rotation Number: 100 to 150 rpm.

Example 1

The following polyurethane resin, solvent and pore generation agent were used as starting materials.

Resamine CUS-1500

(manufactured by Dainichiseika Color & Chemicals Mfg. Co., Ltd., polycarbonate type polyurethane, nonvolatile content 30%) 100 parts by weight, Dimethylformamide 50 parts by weight, and Anhydrous calcium chloride 50 parts by weight.

These were put in a kneader vessel to knead with the rotation number of 15 rpm. Since a heat was generated just after starting the kneading, the kneading was carried out under cooling the vessel equipped with a jacket for circulating water. The kneaded was extruded out from a vent-type extruder having a screw with 40 mm (40 Φ) diameter which was connected with a tube nozzle with 46 mm outer diameter and 20 mm inner diameter, coagulated, washed in a washing machine, dried in a box-type dryer, and then cut to obtain a cylindrically shaped continuous pore elastomer with an outer diameter of 42 mm, inner diameter of 19 mm and length of 450 mm. The evaluation result of the thus obtained continuous pore elastomer is shown in Table 1, and a photo taken by scanning electron microscope is shown in FIG. 1.

Comparative Example 1

Figure 2:
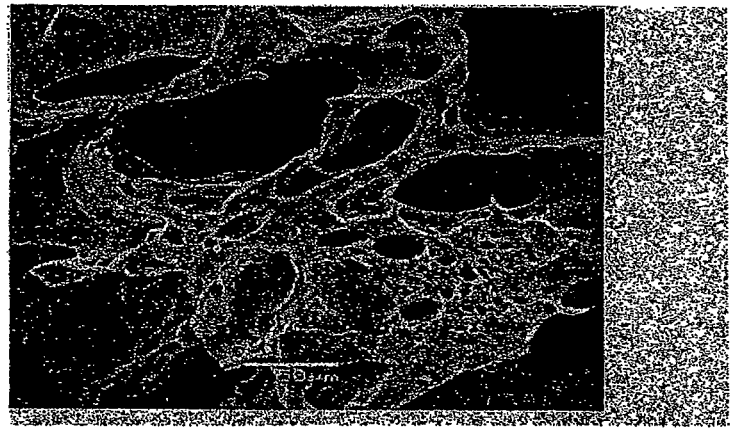
[FIG. 2] A scanning electron microscope photo of the continuously porous foam obtained in Comparative example 1.

Except for using 50 parts of polyvinylalcohol in place of the anhydrous calcium chloride, in the same manner as in Example 1, a composition was kneaded and then subjected to the post-extrusion steps to obtain a continuous pore elastomer. The evaluation result of the thus obtained continuous pore elastomer is shown in Table 1, and a photo taken by scanning electron microscope is shown in FIG. 2.

Comparative Example 2

Figure 3:
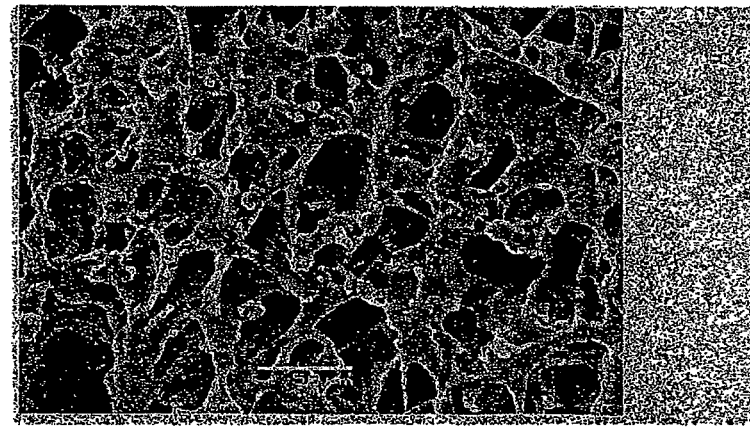
[FIG. 3] A scanning electron microscope photo of the continuously porous foam obtained in Comparative Example 2.

Except for using 350 parts of sodium chloride with a particle size of less than 100 μm in place of the anhydrous calcium chloride, in the same manner as in Example 1, a composition was kneaded and then subjected to the post-extrusion steps to obtain a continuous pore elastomer. The evaluation result of the thus obtained continuous pore elastomer is shown in Table 1, and a photo taken by scanning electron microscope is shown in FIG. 3.

TABLE 1

|  | Example 1 | Comparative Example 1 | Comparative Example 2 |
|---|---|---|---|
| Apparent Density g/cm³ | 0.23 | 0.28 | 0.16 |
| Tensile Strength KPa | 840 | 1100 | 380 |
| Elongation Percentage % | 250 | 310 | 270 |
| Extrudability | Good | Drooped and thinned | Drooped and broken |
| Shape-Retainability b/a | 1.04 | 2.32 | 1.80 |
| Pore State | Uniform three dimensional network structure | Non-uniform network; The network has a tendency of being plugged with membranes. | Non-uniform network having cracks caused during coagulation; The network is partially plugged with membranes. |
| Skeletons' Average Thickness μm | 7.5 (Uniform) | Unmeasurable due to non-uniformity | Unmeasurable due to non-uniformity |

As clearly understood from the results shown in Table 1 and FIG. 1, the continuous pore elastomer of Example 1 (the invention) is excellent in extrudability and shape-retainability. Furthermore, it has the three dimensional network pore structure without membrane plugging of the network, and the skeletons constructing the network structure have almost equal thicknesses. On the other hand, the molded articles obtained in Comparative Example 1 and Comparative Example 2, as shown in FIGS. 2 and 3, although having a porous structure, membranes plugging of the network are observed and thicknesses of skeletons thereof are non-uniform.

Example 2

After further adding, to the starting materials for the composition of Example 1, 5 parts of NONION OT-221 (manufactured by NOF CORPORATION, polyethyleneglycol-sorbitan monooleate, HLB value 15.0), the post-kneading steps were carried out in the same manner as in Example 1 and was evaluated. The evaluation result of the thus obtained continuous pore elastomer is shown in Table 2. Furthermore, in the center hole of the tube molded article, a shaft was mounted to form a roller. Thereafter, a grinding processing was carried out to enhance the smoothness of the surface and circularity of the roller, and a quantity of residual water was measured by the above-mentioned method. The results are shown in Table 2.

Example 3

In an aqueous solution at 40° C. containing NONION OT-221 1% by weight, the continuous pore elastomer obtained in Example 1 was immersed and left therein for 10 minutes, and then taken out to be subjected to a centrifugal dehydration. The weight of the continuous pore elastomer before the immersion was 111 g; while that after the centrifugal dehydration was 189 g. This was dried at 100° C. in a box-type hot-air drier, followed by subjected to a grinding processing with the same manner as in Example 2 to measure a quantity of residual water. The results are shown in Table 2.

Comparative Example 3

Except for using 5 parts of ADEKA ESTOL S-80 (manufactured by ADEKA CORPORATION, polyoxyethylenesorbitan monooleate, HLB value 4.3) in place of NONIONOT-221, the steps were carried out in the same manner as in Example 2. The evaluation result of the thus obtained continuous pore elastomer is shown in Table 2.

TABLE 2

|  |  | Example 2 | Example 3 | Comparative Example 3 |
|---|---|---|---|---|
| Apparent Density g/cm³ |  | 0.26 | 0.23 | 0.26 |
| Tensile Strength KPa |  | 740 | 780 | 770 |
| Elongation Percentage % |  | 215 | 230 | 210 |
| Water Absorbency | Dropping Method | instantly | instantly | no water absorption after the elapse of 15 min. or more |
|  | Byreck method mm | 35 | 30 | 0 |
| Extrudability |  | good | good | good |
| Shape-Retainability b/a |  | 1.05 | 1.04 | 1.07 |
| Pore State |  | uniform three dimensional network | uniform three dimensional network | uniform three dimensional network |
| Skeletons' Average Thickness μm |  | 9.8 | 7.5 | 6.9 |
| Residual Water Quantity g/1000 cm² |  | 0.18 | 0.18 | 3.4 |

Example 4

Except for making the shape of the continuous pore elastomer a tube having an inner diameter of 1 mm and outer diameter of 5 mm by changing extruding conditions, a continuous pore elastomer was obtained in the same manner as in Example 2, followed by cutting in a length of 15 mm. In the center hole of the thus obtained continuous pore elastomer, a rod made of polypropylene with a sharpened end and having 2.0 mm diameter and 10 cm length was put in to form a swab. When water droplets on a glass plate were wiped with the swab, the droplets were absorbed into the continuous pore elastomer within 1 to 2 seconds and the droplets on the glass plate were completely wiped out.

Although similar experiments were carried out with a cotton swab, knitted polyester cloth swab, dry-foaming polyurethane foam sponge swab and ultramicro filament cloth swab having the similar sizes to that of the above swab in Example 4, in such every case it was unable to completely wiped out the water droplets on the glass plate within 1 to 2 seconds because the droplets were spread out before being absorbed.

What is claimed is:

1. A continuous pore elastomer formed of a polyurethane, wherein said elastomer has a three dimensional network pore structure of skeletons that have an average thickness of 20 μm or less and 80% or more of the skeletons have a thickness within the range of 6 to 15 μm, said elastomer having an apparent density of 0.2 to 0.4 g/cm$^3$, and said elastomer containing a surfactant with a HLB value of 8 or more.

2. A continuous pore elastomer according to claim 1, wherein the HLB value of the surfactant is 8 to 19.

3. A water-absorbing roller formed from the continuous pore elastomer according to claim 1.

4. A swab featured by using the continuous pore elastomer according to claim 1.

5. A water-absorbing roller formed from the continuous pore elastomer according to claim 2.

6. A swab featured by using the continuous pore elastomer according to claim 2.

7. A continuous pore elastomer according to claim 1, wherein the polyurethane is formed by reacting
- a polyol having a molecular weight of 500 to 10,000 selected from the group consisting of polyether, adipate, polyester, polycarbonate and polyolefin polyols;
- a chain extender; and
- a polyisocyanate compound selected from the group consisting of aromatic, alicyclic, and aliphatic isocyanates.

* * * * *